(12) United States Patent
Okamoto

(10) Patent No.: US 6,266,360 B1
(45) Date of Patent: Jul. 24, 2001

(54) DIRECT-SPREAD-SPECTRUM COMMUNICATION SYSTEM

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/010,977

(22) Filed: Jan. 22, 1998

(30) Foreign Application Priority Data

Feb. 17, 1997 (JP) .................................... 9-031539

(51) Int. Cl.$^7$ .................................... H04L 27/50
(52) U.S. Cl. .................. 375/140; 375/141; 375/142; 375/143; 375/144; 370/347
(58) Field of Search .................. 375/140, 141, 375/142, 144, 145; 370/445, 447, 335, 462, 342, 441, 376, 347, 329

(56) References Cited

U.S. PATENT DOCUMENTS

| 5,414,717 | * | 5/1995 | Matsumoto et al. | 371/32 |
| 5,537,414 | * | 7/1996 | Takiyasu et al. | 370/95.1 |
| 5,983,382 | * | 11/1999 | Pauls | 714/744 |

FOREIGN PATENT DOCUMENTS

| 8-265215 | * | 10/1996 | (JP) . |
| 9-55714 | * | 2/1997 | (JP) . |
| 9-270735 | * | 10/1997 | (JP) . |
| 9-298491 | * | 11/1997 | (JP) . |

OTHER PUBLICATIONS

"Wireless Access Method and Physical Layer Specification" by M. Fischer, IEEE p 802.11–95/109 Jul, 1995 pp.1–5*

* cited by examiner

Primary Examiner—Stephen Chin
Assistant Examiner—Shuwang Liu

(57) ABSTRACT

To improve the throughput of a direct spread-spectrum communication system transmitting and receiving signals multiplexed according to a data format having a simplex portion and a multiplexed portion, a transmission error ratio of ACK and NAK signals is decreased and the transmission method is changed according to the transmission path conditions and is achieved by controlling the number of multiplexed data in data packets or aerial diversity based on the results of a number of counts of NAK signals or the calculation of an ACK to NAK signal count ratio.

14 Claims, 12 Drawing Sheets

FIG.8A

| SIGNAL FOR BIT-SYNCHRONIZATION | SYNCHRO-NIZATION-PATTERN | VARIOUS INFORMATION SIGNAL | THE NUMBER OF MULTIPLEXED DATA | PACKET LENGTH | CRC |

FIG.8B

| SIGNAL FOR BIT-SYNCHRONIZATION | SYNCHRO-NIZATION-PATTERN | VARIOUS INFORMATION SIGNAL | (ACK/NAK) (RTS/CTS) | CRC |

SIMPLEX

5-MULTIPLEXED

3-MULTIPLEXED

2-MULTIPLEXED (a)

(b)

DIRECT-SPREAD-SPECTRUM COMMUNICATION SYSTEM

BACKGROUND OF THE INVENTION

The present invention relates to a communication method applied to a spread-spectrum communication system.

A spread-spectrum communication system has been recently developed and put to the practical use, and has an advantage which is immunity to interference such as multipath interference and color noise as compared with the usual narrow-bandwidth communication.

The spread-spectrum communication system, however, involves a problem that the high-speed data transmissions need to use a bandwidth widened by a factor of a spread-coefficient of a signal to be transmitted. For example, when data of 1 Mbps is transmitted by using a code having a spread-coefficient of 11, the data transmission rate is 11 Mcps (chips per second). If data of 10 Mbps is transmitted, the chip rate is 110 Mcps. This condition is difficult to realize since a necessary bandwidth is of 110 MHz to 220 MHz and the circuit must operate at an increased rate.

Accordingly, the present applicant has proposed two methods of increasing the data transmission rate without increasing the chip rate by applying multiplexing spread-spectrum signals. One of the methods is a spread-spectrum signal multiplexing system described in Japanese Laid-open Patent Publication (TOKKAI HEI) No. 9-55714 and the other mission system having a multiplex portion and a not-multiplexed portion, which have filed in Japanese Laid-open Patent Publication (TOKKAI HEI) No. 9-298491.

The use of these methods can increase the data transmission rate without increasing the chip rate.

The latter prior art method mentioned above use a data format having a not-multiplexed (simplex) portion and a multiplexed portion while the former having all multiplexed portions.

The data transmission format including the simplex portion and the multiplex portion is used for providing the compatibility of the data communication system. In this system, each station can select a desired multiplexing number for data transmission and, therefore, a receiving station can not receive data without previously knowing the multiplexing number of the transmission.

With a system using the previously determined multiplexing number, each station can transmit all signals in a multiplexed state.

With a system not changing a predetermined multiplexing number, a transmitting station must inform a receiving station of the number of data multiplexed and transmitted thereto.

For this purpose, a simplex sequence portion of the data transfer format is written with common information including the multiplex number which will be selected by the receiving station.

The data communication is usually conducted between a transmitting station and a receiving station when the latter selected the informed multiplex number thus decided at and transmitted from the former.

In multiplexed data transmission, the characteristics of a carrier-to-noise power ratio to an error rate become worse as the multiplex number increases. Correlatively improved characteristics were obtained by applying a technique proposed by the present applicant in Japanese Patent Application Serial No. 8-13963. At BER=$10^{-5}$ (where BER is Bit Error Rate) a necessary C/N value of 5-multiplex transmis-sion without correlation improvement differs by 15 dB from that of the simplex transmission. There is still a difference of about 7.5 dB between the 5-multiplex transmission with correlation improvement according to the method proposed by the present applicant and the simplex transmission.

An example of packet mode communication by the above-mentioned multiplex system is described as follows:

The communication is now conducted between Stations A and B. The station A transmits a packet of data to the station B. Upon receipt of the data packet the station B transmits an ACK (acknowledge) signal or a NAK (Negative acknowledge) signal to the station A if the received data was correct or incorrect. This judgment is usually made by checking such an error detection code as a CRC (Cyclic Redundancy Check) contained in the received data.

On receipt of the ACK signal, the station A transmits a next packet of data to the station B. With the NAK signal received or no response from the station B, the station A re-transmits the same packet once transmitted to the station B.

In a general data communication system, a transmission error may occur in a packet containing a long data portion but ACK and NAK signals containing short data may rarely be subject to transmission error.

However, a multiplex transmission system previously proposed by the present applicant encountered a problem that an increase of the multiplexing number is associated with a larger increase of the transmission error rate as compared with that in a typical conventional data communication system and even the ACK and NAK signals from the station B may also be lost or incorrectly received. With incorrectly received response signal, the station A must re-transmit the packet once transmitted to the station B even if the latter correctly received the same packet. If so, the station A transmits the unnecessary packet instead of a next packet, resulting in lowering total throughput of the communication.

SUMMARY OF THE INVENTION

In view of the above-mentioned problems of the prior art, the present invention was made to provide a direct-spread-spectrum communication system using a data format comprising a simplex field sequence and a multiplexed field sequence, which can attain a reduced transmission error of ACK and NAK signals and an improved throughput of transmissions by adaptively changing the transmission method depending upon the state of transmission line.

(1) Accordingly, an object of the present invention is to provide a direct-spread-spectrum communication system for transmitting and receiving signals spread by using spread-code and multiplexed according to a data format having a simplex (not multiplexed) portion plus a multiplexed portion or only a multiplexed portion or only a simplex portion by using multiplexing means for multiplexing signals at a delay time of any desired number of chip of the spread-code, said spread signals to be transmitted and to be received being packetized and transmitted by an ARQ (Automatic Repeat Requesting) method, wherein an ACK (Acknowledge) signal and a NAK (Negative Acknowledge) signal for acknowledging the receipt of correctly or incorrectly transmitted data are transmitted and received as simplex (not multiplexed) spread-spectrum signals, thus improving an error ratio of the response signals.

(2) Another object of the present invention is to provide a direct-spread-spectrum communication system as mentioned in (1) above, characterized in that a procedure for recognizing the connection between terminals by a CSMA/CA (Carrier Sense Multiple Access with Call Accepted) with RTS/CTS (Request To Send/Clear To Send) method before transmitting and receiving a data portion in the data format is provided with a packet for recognizing the establishment of the connection is transmittable and receivable as a simplex (not multiplexed) spread-spectrum signal, thus improving an error rate of the connection acknowledgment.

(3) Another object of the present invention is to provide a direct-spread-spectrum communication system as mentioned in (1) or (2) above, characterized in that a response data format for ARQ system includes a flag for identifying response signals and response data such as ACK signal arranged in fields of the response data format where the number of multiplexed data and packet length were previously arranged and now omitted, thus shortening a packet length.

(4) Another object of the present invention is to provide a direct-spread-spectrum communication system as mentioned in any one of (1) and (3) above, characterized in that the number of multiplexed data in the multiplexing means is variable and is decreased by control when a result of counts of received NAK signals indicating incorrect receipt of transmission including no response or incorrectly received response reaches a specified preset value and then data in a less multiplexed state is re-transmitted and received. This enables the system to improve an error rate of transmissions over wrong propagation path.

(5) Another object of the present invention is to provide a direct spread-spectrum communication system as mentioned in any one of (1) and (4) above, characterized in that the system is further provided with an aerial diversity switching system by which a current working antenna (aerial diversity) is switched over to another when a result of counts of received NAK signals indicating incorrect receipt of transmission including no response or incorrectly received response reaches a specified preset value, and data is then re-transmitted therethrough and received.

(6) Another object of the present invention is to provide a direct spread-spectrum communication system for transmitting and receiving signals spread by using spread-code and multiplexed according to a data transfer format having a simplex portion plus a multiplexed portion by using multiplexing means for multiplexing signals at a delay time of any desired number of chip of the spread-code, said spread signals to be transmitted and received being packetized and transmitted by an ARQ (Automatic Repeat Requesting) method, wherein the number of data to be multiplexed in the multiplexing means is controlled, a frequency of ACK signals for acknowledging the receipt of correctly transmitted signals and a frequency of NAK signals for acknowledging the receipt of incorrectly transmitted signals including no response or incorrectly received response are countable separately and the number of data to be multiplexed, transmitted and received is adaptively controlled according to an ACK to NAK ratio determined from the frequency counts.

(7) Another object of the present invention is to provide a direct-spread-spectrum communication system as mentioned in any one of (1) to (6) above, characterized in that the system is further provided with the aerial diversity switching system to change a working antenna diversity according to a ratio of counts of correctly received ACK signals indicating correct receipt of transmission to counts of received NAK signals indicating incorrect receipt of transmission including no response or incorrectly received response and, then, transmits data at the selected aerial diversity, thus enables the system to maintain well transmit-and-receive state.

(8) Another object of the present invention is to provide a direct-spread-spectrum communication system as mentioned in any one of (4) to (7), characterized in that the number of data to be multiplexed, which has been received, is used as an initial value to be set at the multiplexing means when a direction of data communication between stations is reversed. This enables the system to use the number of multiplexed data, which can be considered to be a nearly optimal value.

(9) Another object of the present invention is to provide a direct-spread-spectrum communication system as mentioned in any one of (1) to (8) above, characterized in the number of data to be multiplexed in the multiplexing means is changeable by, a delay dispersion of the ACK or NAK signal transmitted and received in a simplex (not-multiplexed) state is calculated and an optimal value of the number of data to be multiplexed for transmission is determined according to the calculation result of the delay dispersion and quickly set at the multiplexing means.

(10) Another object of the present invention is to provide a direct spread-spectrum communication system as mentioned in (9) above, characterized in that the system is composed of a base station and a terminal station, wherein only the base station calculates the delay dispersion of the simplex signal and determines the number of data to be multiplexed for transmission according to the calculation result and the terminal station sets the number of data to be multiplexed, which is determined by the base station. This requires for the system to increase the circuitry of only the base station.

(11) Another object of the present invention is to provide a direct spread-spectrum communication system as mentioned in any one of (1) to (10) above, characterized in that the system is a one-to-multiple or multiple-to-multiple communication system in which each of stations composing the system can control the number of data to be multiplexed for transmission in the multiplexing means and stores the multiplexing numbers previously determined for respective connectable stations together with respective identifications and sets at the multiplexing means the necessary multiplexing number by selecting it from the stored values. This enables the each station to optimally communicate with any other stations even if they may be frequently changed to another.

BRIEF DESCRIPTION OF DRAWINGS

FIGS. 8A and 8B show a header field of a data packet format to be used for a communication system according to an aspect of the present invention.

PREFERRED EMBODIMENTS OF THE INVENTION

Prior to explaining preferred embodiments of the present invention, prior art direct-spread-spectrum communication system will be described below as references for the present invention.

A spread-spectrum communication system has been recently developed and put to the practical use, and has an advantage which is immunity to interference such as multipath interference and color noise as compared with the usual narrow-bandwidth communication.

The spread-spectrum communication system, however, involves a problem that the high-speed data transmissions need to use a bandwidth widened by a factor of a spread-coefficient of a signal to be transmitted. For example, when data of 1 Mbps is transmitted by using a code having a spread-coefficient of 11, the data transmission rate is 11 Mcps (chips per second). If data of 10 Mbps is transmitted, the chip rate is 110 Mcps. This condition is difficult to realize since a necessary bandwidth is of 110 MHz to 220 MHz and the circuit must operate at an increased rate.

Accordingly, the present applicant has proposed two methods of increasing the data transmission rate without increasing a chip rate by applying multiplexing spread-spectrum signals. One of the methods is a spread-spectrum signal multiplexing system described in Japanese Laid-open Patent Publication (TOKKAI HEI) No. 9-55714 and the other mission system having a multiplex portion and a not-multiplexed portion, which have filed in Japanese Laid-open Patent Publication (TOKKAI HEI) No. 9-298491.

The use of these methods can increase the data transmission rate without increasing the chip rate.

Figure 1A:
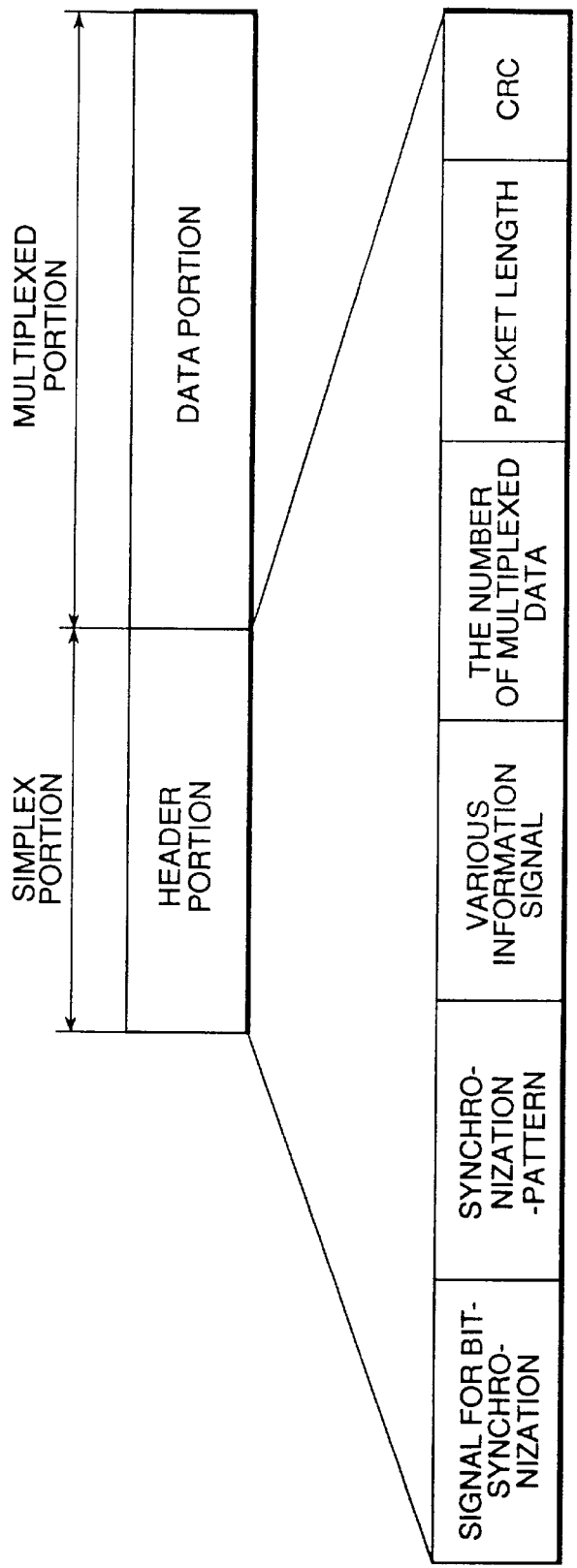
FIG. 1A is one example of a data format to be used for a prior art communication system.
Figure 1B:
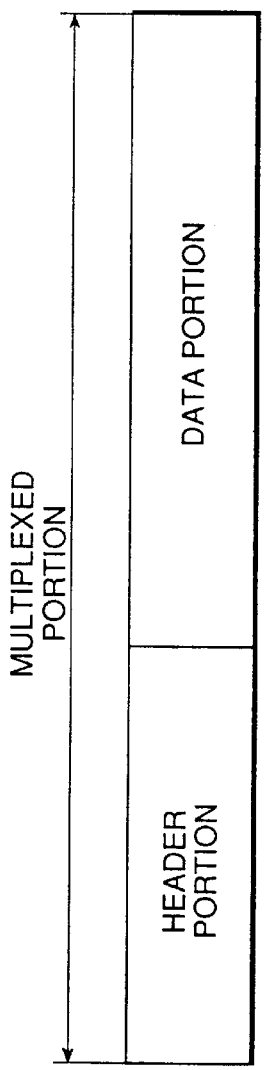
FIG. 1B is another example of a data format to be used for a prior art communication system.

The latter prior art method mentioned above use a data format shown by way of an example in FIGS. 1A and 1B.

FIG. 1A shows a data transfer format having a not-multiplexed (simplex) portion and a multiplexed portion while FIG. 1B shows a data transfer format having all multiplexed portions.

The data transmission format including the simplex portion and the multiplex portion is used for providing the compatibility of the data communication system. In this system, each station can select a desired multiplexing number for data transmission and, therefore, a receiving station can not receive data without previously knowing the multiplexing number of the transmission.

With a system using the previously determined multiplexing number, each station can transmit all signals in a multiplexed state as shown in FIG. 1B. With a system having not predetermined multiplexing number, a transmitting station must inform a receiving station of the number of data multiplexed and transmitted thereto.

For this purpose, a simplex sequence portion of the data transfer format (as shown in FIG. 1A) is written with common information including the multiplex number which will be selected by the receiving station.

The data communication is usually conducted between a transmitting station and a receiving station when the latter selected the informed multiplex number thus decided at and transmitted from the former.

Figure 2:
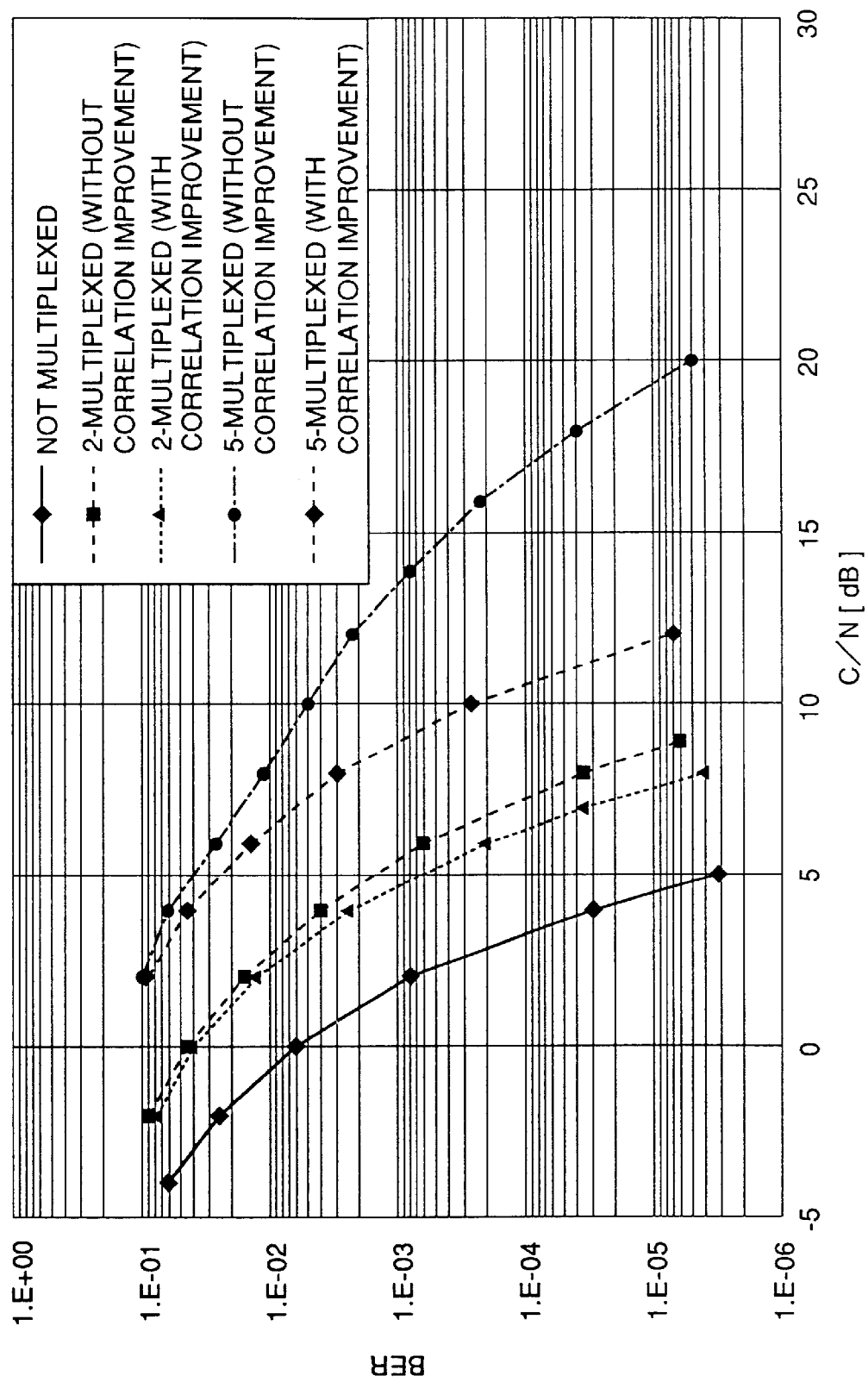
FIG. 2 shows characteristic curves of carrier-to-noise ratio to error rate at variable multiplex number values with and without improvement.

In multiplexed data transmission, the characteristics of a carrier-to-noise power ratio to an error rate become worse as the multiplex number increases. FIG. 2 shows an example of this correlation. In FIG. 2, there are plotted results of experiments with four types of multiplexed data: simplex, double multiplexed with and without correlation improvement and five multiplexed with and without correlation improvement. The correlatively improved characteristics were obtained by applying a technique proposed by the present applicant in Japanese Patent Application Serial No. 8-13963. At BER=$10^{-5}$ (where BER is Bit Error Rate and $10^{-5}$ is expressed as 1.E-05 on the graph of FIG. 2), a necessary C/N value of 5-multiplex transmission without correlation improvement differs by 15 dB from that of the simplex transmission. There is still a difference of about 7.5 dB between the 5-multiplex transmission with correlation improvement according to the method proposed by the present applicant and the simplex transmission.

Figure 3:
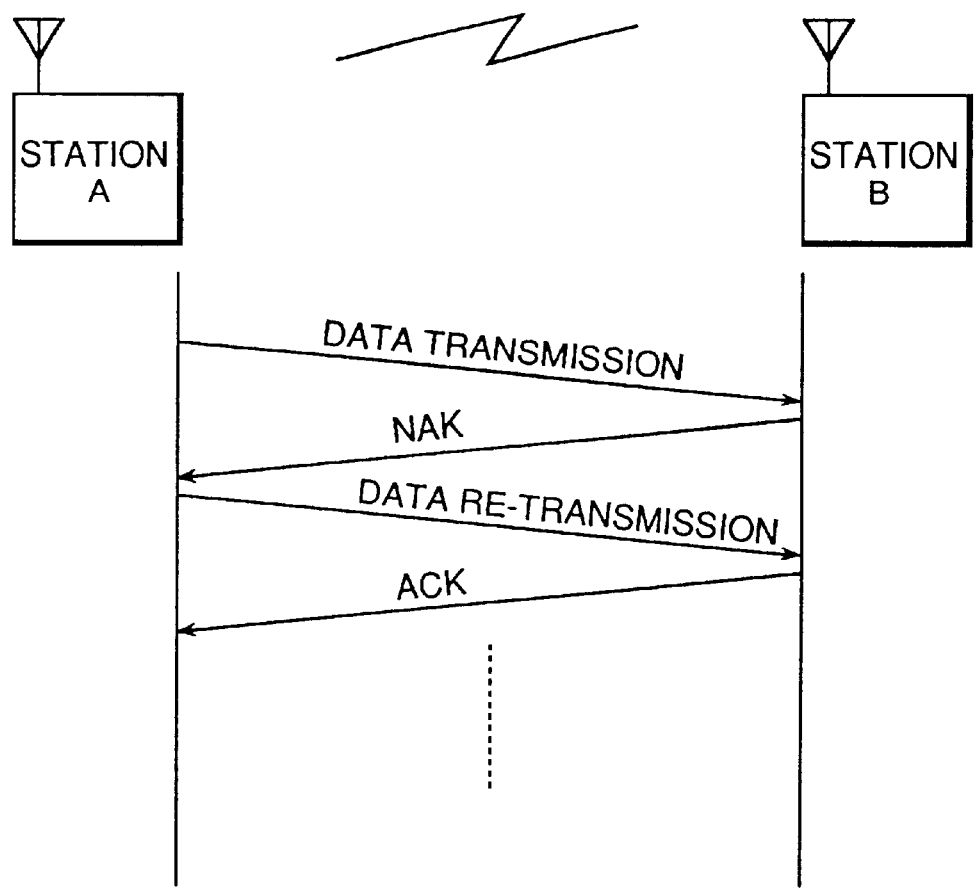
FIG. 3 is a view depicting a prior art transmission procedure of transmitting/receiving data packets by using a multiplex system.

Referring to FIG. 3, an example of packet mode communication by the above-mentioned multiplex system is described as follows:

The communication is now conducted between Stations A and B. The station A transmits a packet of data to the station B. Upon receipt of the data packet the station B transmits an ACK (acknowledge) signal or a NAK (Negative acknowledge) signal to the station A if the received data was correct or incorrect. This judgment is usually made by checking such an error detection code as a CRC (Cyclic Redundancy Check) contained in the received data.

On receipt of the ACK signal, the station A transmits a next packet of data to the station B. With the NAK signal received or no response from the station B, the station A re-transmits the same packet once transmitted to the station B.

In a general data communication system, a transmission error may occur in a packet containing a long data portion but ACK and NAK signals containing short data may rarely be subject to transmission error.

However, a multiplex transmission system previously proposed by the present applicant encountered a problem that an increase of the multiplexing number is associated with a larger increase of the transmission error rate as compared with that in a typical conventional data communication system and even the ACK and NAK signals from the station B may also be lost or incorrectly received. With incorrectly received response signal, the station A must re-transmit the packet once transmitted to the station B even if the latter correctly received the same packet. If so, the station A transmits the unnecessary packet instead of a next packet, resulting in lowering total throughput of the communication.

Figure 4A:
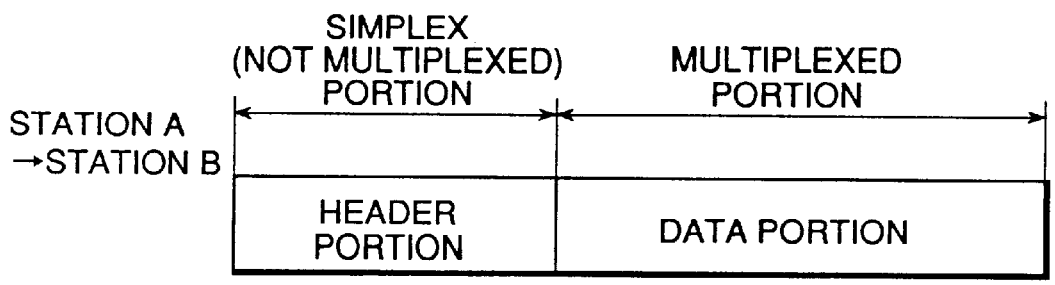
FIGS. 4A and 4B show an example of a data format to be used for a communication system according to one aspect of the present invention.
Figure 4B:
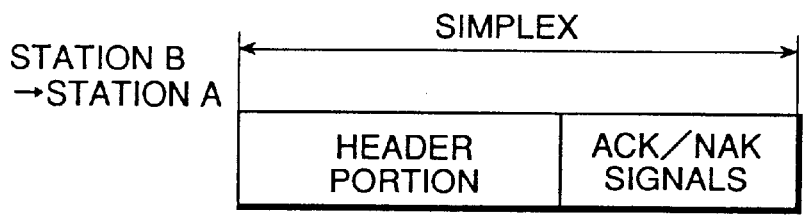
Figure 5A:
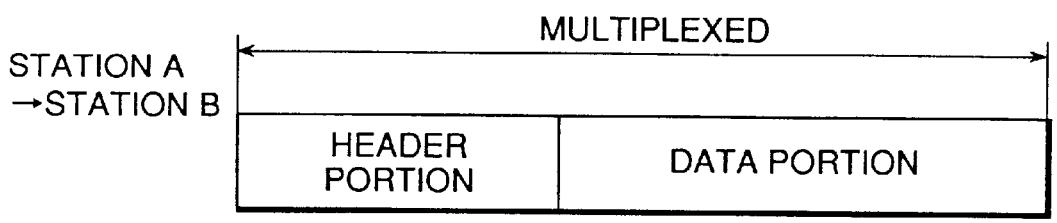
FIGS. 5A and 5B show an example of a data format to be used for a communication system according to another aspect of the present invention.
Figure 5B:
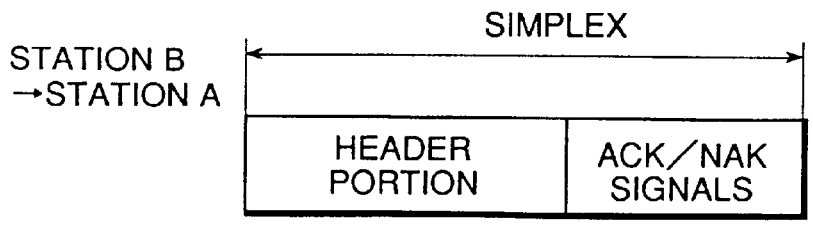

Referring now to FIGS. 4A, 4B, 5A and 5B, a preferred embodiment of the present invention will be described as follows:

The data formats shown in FIGS. 4A and 4B and shown in FIG. 5A and 5B correspond to the examples of FIG. 1A and FIG. 1B, respectively, for the prior art.

In FIG. 4A, the format includes a simplex header portion and a multiplexed data portion. The header portion is analogous in structure to the header portion of the format of FIG. 1A.

On receipt of the header portion, the station B synchronizes a spread-spectrum signals, reproduces the clock and accomplishes the automatic gain control (AGC) according to a signal for bit-synchronization and synchronization of the data by synchronization-pattern.

The station B looks for and recognizes information about the multiplexing number and aligns its circuit to the recognized multiplexing number. The station B then knows the length of the packet received, decodes the packet and performs cyclic redundancy checking (CRC) to judge whether data was correctly received or not.

On the basis of the judgment result, an upper layer computer of the station B determines which signal ACK or NAK to be sent to the station A. The signal ACK or NAK is sent to the station A in the simplex (not multiplexed) format together with a signal indicating the multiplexing number being always 1.

On receipt of the signal from the station B, the station A similarly synchronizes the spread-spectrum signals and reproduces the clock and accomplishes the automatic gain control (AGC) according to a signal for bit-synchronization and synchronization of the data by synchronization-pattern.

The station A recognizes the multiplexing number by the received information and aligns its circuit to the number recognized. The station A then receives the signal ACK or NAK and perform error checking by using a CRC to determine whether data was correctly received or not.

In this instance, the signals ACK and NAK transmitted in the simplex state can have a considerably improved error rate as compared with that of the signals transmitted in a multiplexed format. For example, they attain an error rate improved by 7.5–15 dB as compared with those transmitted in a 5-multiplexed format.

Thus, the transmission error with signals ACK and NAK can be surely reduced by sending them in the simplex format.

This decreases the probability of re-transmission of an unnecessary packet due to the incorrect receipt (transmission error) of the ACK signal at the station A.

The simplex transmission of a signal ACK or NAK signal requires a little longer time than the multiplexed data transmission but a total throughput of the transmissions can be considerably improved because it takes much time for re-transmitting an error packet from the station A.

The case of FIGS. 5A and 5B are described below:

This data format is used for multiplexing all signals used for transmission, including data to be transmitted, and has a header portion similar to that in a conventional format and is also multiplexed. The multiplexing number was previously defined at the time when the communication system has been brought into operation.

The header has a data structure similar to that of the example shown in FIGS. 4A and 4B excepting that it does not need the multiplexing number information because this number has been previously defined and known.

At the station B, the receiver is preset to the known multiplexing number. On receipt of the header portion, the station B synchronizes a spread spectrum signals and reproduces the clock and accomplishes the automatic gain control (AGC) according to a signal for bit-synchronizing and synchronization of the data by synchronization-pattern.

The station B then knows the length of the packet received, decodes the packet and performs cyclic redundancy checking (CRC) to judge whether data was correctly received or not.

On the basis of the judgment result, the upper layer processor of the station B determines which signal ACK or NAK to be sent to the station A. The signal ACK or NAK is sent to the station A in the simplex (not multiplexed) format.

On the other hand, the station A is ready to receive a simplex (not multiplexed) signal at its receiver since it is a common known rule that a ACK or NAK signal is sent in simplex format from the station B. On receipt of the signal from the station B, the station A similarly synchronizes the spread-spectrum signals and reproduces the clock and accomplishes the automatic gain control (AGC) according to a signal for bit-synchronization and synchronization of the data by synchronization-pattern.

The station A then receives the signal ACK or NAK and perform error checking by CRC in the data to determine whether data was correctly received or not.

In this instance, the signals ACK and NAK transmitted in the simplex mode can have a considerably improved error rate as compared with that of the signals transmitted in a multiplexed state.

Thus, the transmission error with signals ACK and NAK can be surely reduced by sending them in the simplex format.

This decreases the probability of re-transmission of an unnecessary packet due to the incorrect receipt of the signal ACK at the station A.

Particularly in the shown case, a transmitter-receiver unit must be set into the multiplex mode when transmitting data and it must be set into the simplex mode when receiving an ACK signal or a NAK signal after the transmitting. A transmitter-receiver unit must be set into the multiplex mode when standing by for receiving since the data in the format is always multiplexed.

The simplex transmission of the signal ACK or NAK requires a little longer time than the multiplexed data transmission but a total throughput of the system can be considerably improved because it takes much time for re-transmitting error packet from the station A.

Referring to FIGS. 6A, 6B, 6C, 7A, 7B and 7C, a second embodiment of the present invention is described as follows:

This is an example of a CSMA/CA (Carrier sense multiplex access with call Accepted) system with RTS/CTS (Request To Send/Clear To Send) functions.

In the first embodiment, the transmitting station can first transmit data to the receiving station. In the system according to the second embodiment, there is a high possibility of collision of the transmissions and, therefore, a transmitting station sends to the a receiving station a short signal for recognizing whether the connection with the station is possible or not.

After receiving an ACK signal from the receiving station, the transmitting station transmits data to the receiving station. This may avoid transmission of full length of data to a party that can not receive it, thus improving the total throughput of the system.

Figure 6A:
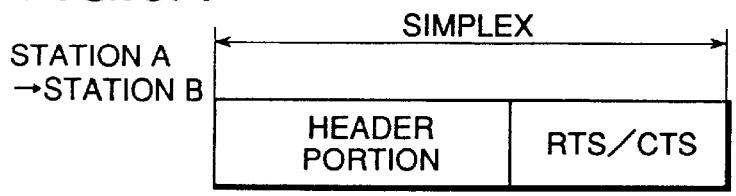
FIGS. 6A, 6B and 6C show an example of a data format to be used for a communication system according to another aspect of the present invention.
Figure 6B:
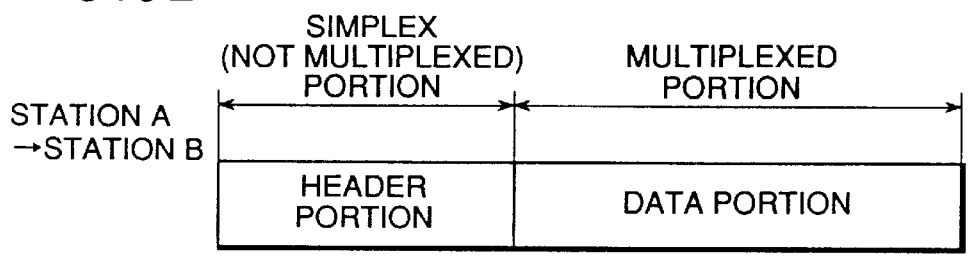
Figure 6C:
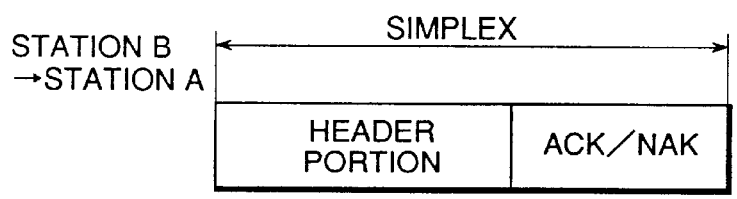

Similarly to the first embodiment, the two cases are considered as follows:

In one case of FIGS. 6A, 6B and 6C, each signal to be transmitted has a header in a simplex (not multiplexed) state and a RTS (Request to Send)/CTS (Clear to Send) portion in a simplex state.

The header portion has the data structure similar to that shown in FIG. 1.

On receipt of the header portion, a receiving station B performs operations for synchronizing the spread-spectrum signals, reproducing a clock, setting AGC according to a signal for bit-synchronization and accomplishing data synchronization by synchronization-pattern.

The station B recognizes the multiplexing number by the received information and aligns its circuit to the number recognized as 1 (simplex). The station B then transmits a response signal in the simplex state (the same as in the first embodiment). This simplex signal is used for acknowledging the connection between the parties is established.

Similarly to the first embodiment, the station A transmits data in a multiplexed state and then in a simplex state.

At the station B, a demodulator synchronizes the spread-spectrum signals and reproduces the clock and then accomplishes the automatic gain control (AGC) according to a signal for bit synchronization and synchronization of the data by synchronization-pattern.

The station B recognizes the multiplexing number by the received information and aligns its circuit to the recognized multiplexing number. The station B then knows the length of the packet received, decodes the packet and performs cyclic redundancy checking (CRC) to judge whether data was correctly received or not.

On the basis of the judgment result, the upper layer processor of the station B determines which signal ACK or NAK to be sent to the station A. The signal ACK or NAK is sent to the station A in the simplex (not multiplexed) format together with a signal indicating the multiplexing number being always 1.

On receipt of the signal from the station B, the station A similarly synchronizes the spread-spectrum signals and reproduces the clock and accomplishes the automatic gain control (AGC) according to a signal for bit-synchronization and synchronization of the data by synchronization-pattern.

The station A recognizes the multiplexing number by the received information and aligns its circuit to the number recognized. The station A then receives the signal ACK or NAK and perform error checking by using a CRC to determine whether data was correctly received or not.

In this instance, it is very important to first recognize the establishment of the connection between both parties. The total throughput of the system can be improved by reducing the error rate of the transmissions between stations.

Figure 7A:
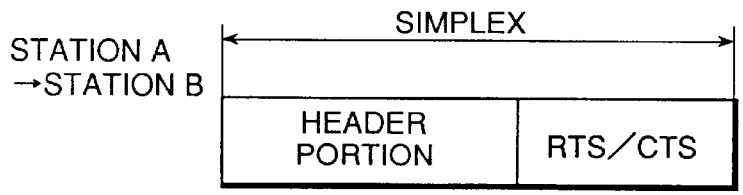
FIGS. 7A, 7B and 7C show an example of a data format to be used for a communication system according to another aspect of the present invention.
Figure 7B:
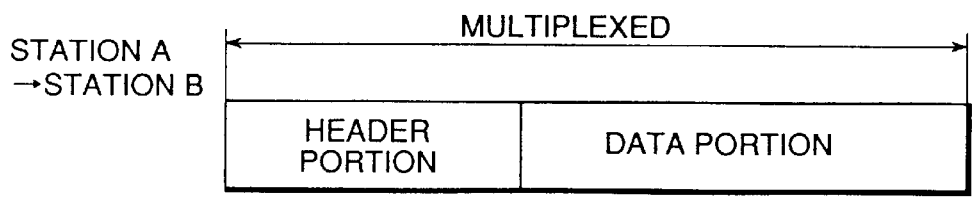
Figure 7C:
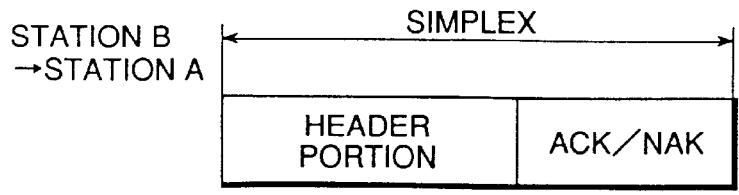

The other case of FIG. 7A, 7B and 7C are described as follows:

Transmitting station A transmits first all signals for establishing the connection with a receiving station B in simplex (not multiplexed) state assuring an improved error rate. After the connection was established, the communication between the stations A and B is carried out in the same manner as described for the embodiment 1 (shown in FIGS. 5A and 5B).

Namely, the data transmission is conducted in the multiplex mode with the preset and known multiplexing number.

The header has a data structure similar to that of the example (shown in FIGS. 6A, 6B and 6C) excepting that it does not need the multiplexing number information because this number has been previously determined and known at the time when the system was brought into operation.

At the station B, the receiver is preset to the known multiplexing number. On receipt of the header information, the station B synchronizes a spread spectrum signals, reproduces the clock and accomplishes the automatic gain control (AGC) according to a signal for bit-synchronization and synchronization of the data by synchronization-pattern.

The station B then knows the length of the packet received, decodes the packet and performs cyclic redundancy checking (CRC) to judge whether data was correctly received or not.

On the basis of the judgment result, the upper layer processor of the station B determines which signal ACK or NAK to be sent to the station A. The signal ACK or NAK is sent to the station A in the simplex (not multiplexed) format.

On the other hand, the station A is ready to receive a simplex (not multiplexed) signal at its receiver since it is a known common rule that a ACK or NAK signal is sent in simplex format from the station B. On receipt of the signal from the station B, the station A similarly synchronizes the spread-spectrum signals and reproduces the clock signal and accomplishes the automatic gain control (AGC) according to a signal for bit-synchronization and synchronization of the data by synchronization-pattern.

The station A then receives the signal ACK or NAK and perform error checking by a CRC in the data to determine whether data was correctly received or not.

Particularly in the shown case, transmitter-receiver unit at both stations A and B are first set into simplex mode when establishing the connection between them and then into the multiplex mode when transmitting and receiving multiplexed data. After this, they are set again into the simplex mode for receiving and transmitting an ACK signal or a NAK signal.

The simplex-mode transmission of the signal ACK or NAK requires a little longer time than the multiplex transmission but a total throughput of the system can be considerably improved because it takes much time for re-transmitting error packet from the station A.

Referring to FIGS. 8A and 8B, a third embodiment of the present invention is described as follows:

In the first and second embodiments, the header portion is analogous to one of the prior art (FIG. 8A) and the response signals (e.g., the ACK signal and so on) are arranged in the data portion.

In this embodiment, a flag for registering an involved response-signals is set in a portion of various information. In this case, the header portion of the present embodiment differs from the prior art example shown in FIG. 8A by the absence of information about the multiplexing number, which is unnecessary since the header portion is always transferred in the simplex mode. Accordingly, a response signal or connecting signal is arranged in the header portion shown in FIG. 8B, which corresponds to the header portion of FIG. 8A in which the multiplexing number and packet length are arranged.

In the data portion of the format, it is needed to use the signals (ACK/NAK, RTS/CTS) and a CRC signal, all of which can be modified from those in the header and inserted in the data portion. By doing so, it becomes possible to use the CRC signal and save the packet length, thus improving the throughput of the system.

This is realized by formatting the response information in the simplex mode that eliminates the need for writing the information about the multiplexing number and, thereby, creates a space to be filled with the signals for response.

Figure 9:
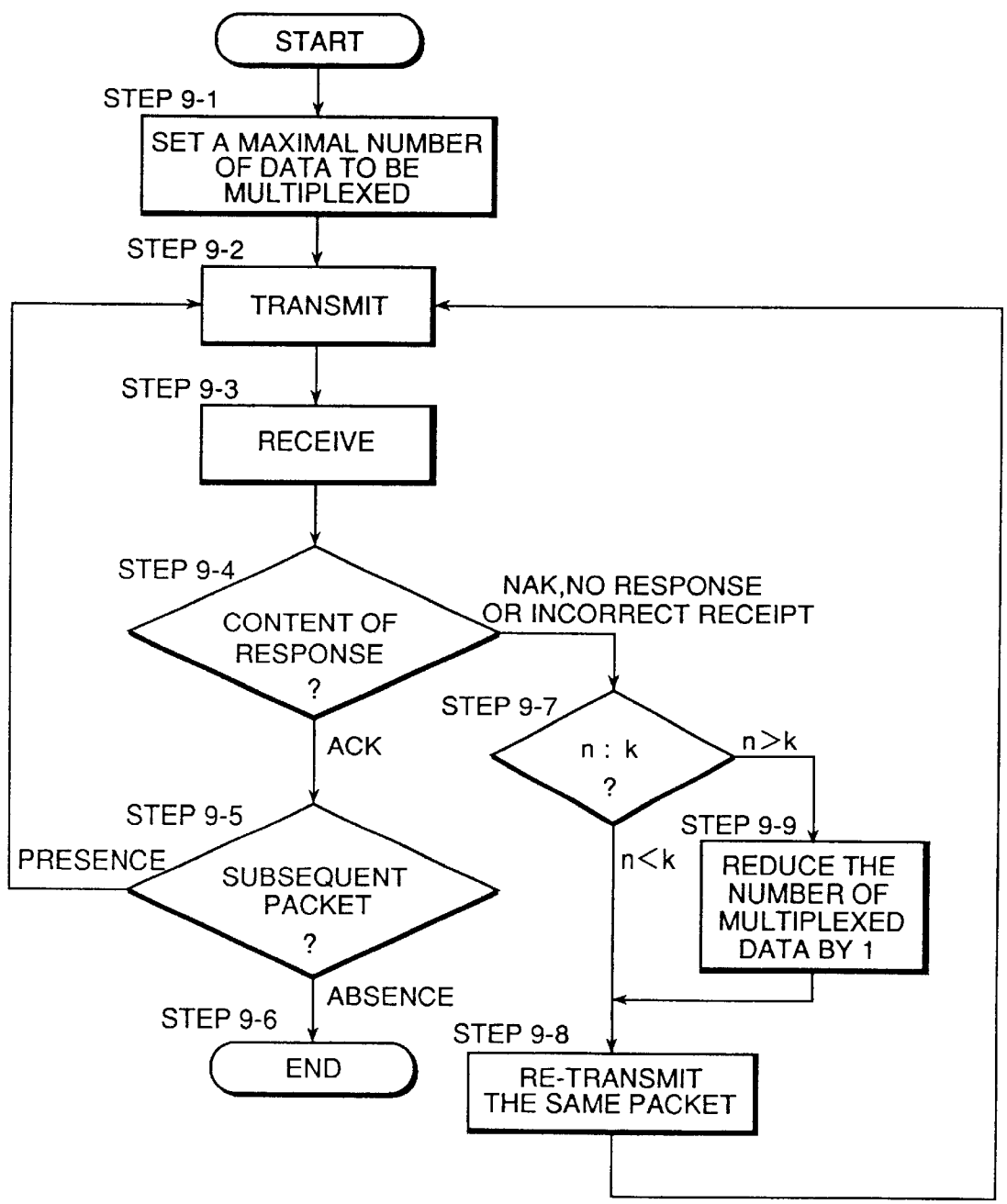
FIG. 9 is a flow chart depicting the operation of a communication system according to one aspect of the present invention.

Referring to a flow chart of FIG. 9, the operation of a fourth embodiment of the present invention is described as follows:

This is an embodiment to be used for the system (A) of FIGS. 4A, 4B, 6A, 6B, 6C and 8B for the embodiments 1 to 3.

First, the system sets a maximal number of multiplexed data (at Step 9-1). In the system (A), a maximal value is set in a simplex portion of the format and the maximum number of multiplexed data (multiplexing number) is set the data portion thereof.

Data is transmitted (Step 9-2) and a ACK or NAK of response signal is received (Step 9-3), then, content of the response signal is checked (Step 9-4). Upon receipt of the ACK signal for acknowledging the correct transmission, a subsequent packet data is detected (Step 9-5) and transmitted if such detected. The data transmission ends when the last requested data was transmitted (Step 9-6).

In the event if a NAK signal or no response is received or any response signal is incorrectly received (at Step 9-4), it is considered that the data could not correctly be received by the receiving party. In this instance, the same packet is transmitted again. Every time when the such event (failure) occurred, the number "n" of the failures (NAK signal, no response and incorrectly received response) is compared with a preset number "k" (Step 9-7) and re-transmission of the same packet is repeated until the number n reaches the preset value k (Step 9-8). When the re-transmission at the time exceeding the preset value k (n>k) resulted in failure, it is considered that propagating conditions are wrong, the C/N is insufficient and/or delay dispersion is large. At this time, the re-transmission is repeated with a reduced number of multiplexed signals in the packet (Step 9-9). The information of the multiplexing number in the simplex portion is, of course, corrected.

As seen from the graph of "C/N-Error rate" characteristics in FIG. 2, the error rate can be reduced by reducing the number of multiplexed data. The occurrence of transmission failures can therefore be reduced. Thus, the procedure is flexibly applied to transmit at a high transfer rate while the transmission is well conditioned and to transmit data in less multiplexed state at a low transfer rate (at a low error rate). This improves a total throughput of the system.

It is also possible to reset an n-counter at 1 if the ACK signal is received after having re-transmitted the same packet several times because the current transmission conditions may be considered as still be allowable. This step, however, is not shown in the flow chart of FIG. 9.

The presettable value "k" shall be determined, based on the results of simulations and experiments, to an optimal value at which a maximal throughput of the system may be obtained.

The performance of the system according to the shown embodiment can be further improved by combining with features of any of the other embodiments based on the respective systems of FIGS. 4A, 4B, 6A, 6B, 6C and 8B.

Figure 10:
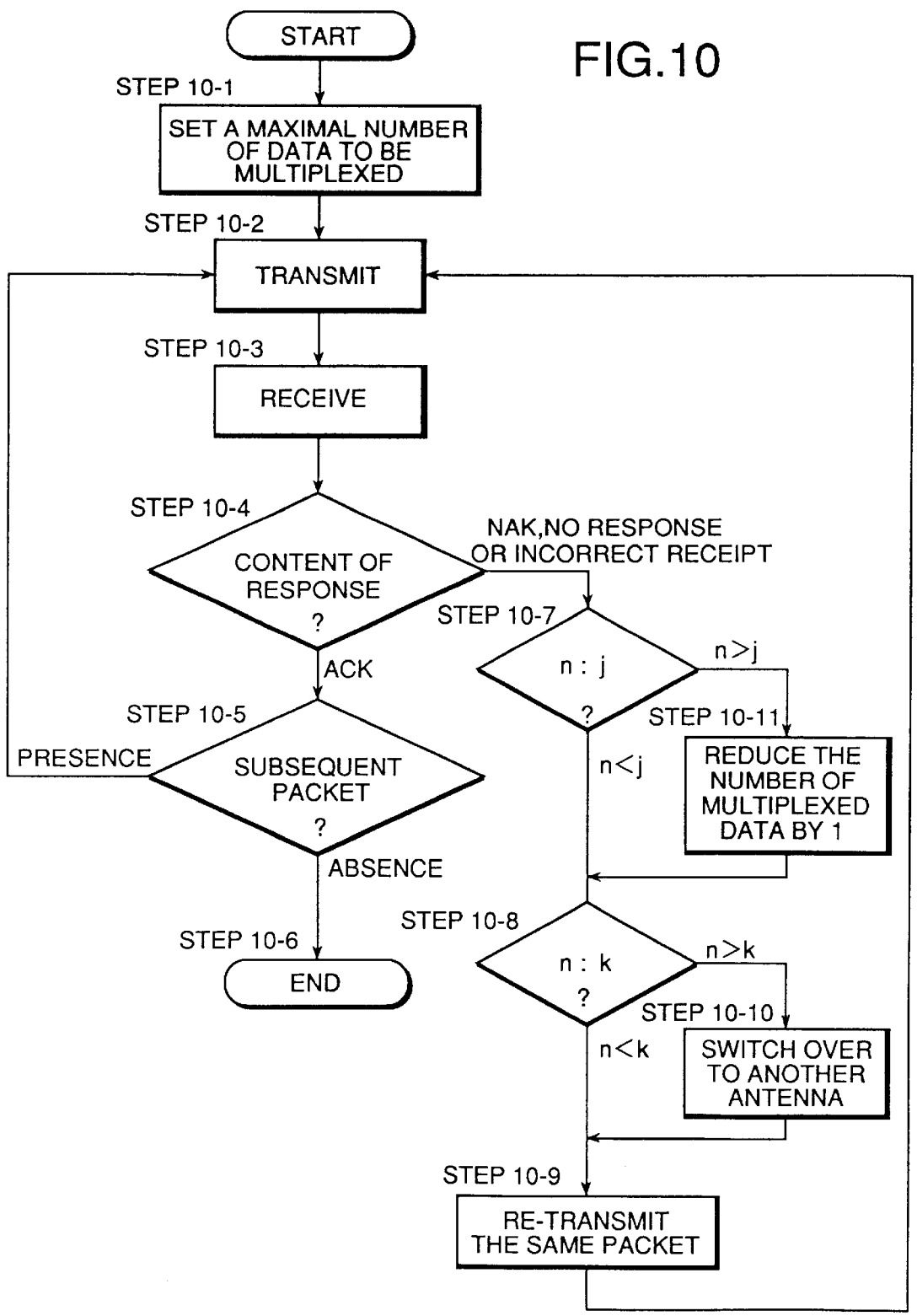
FIG. 10 is a flow chart depicting the operation of a communication system according to another aspect of the present invention.

Referring to a flow chart of FIG. 10, the operation of a fifth embodiment of the present invention is described as follows:

In a spread-spectrum communication system, so called "aerial diversity" techniques using two or more antennas are applied with consideration of the low stability of the propagation path. Among them, the diversity switching technique is preferably used owing to its simple circuitry and effectiveness.

With the aerial diversity switching method for the packet communication, a current working antenna is often changed to another when, not in middle of transmission, an ACK signal could not be received from a receiving party after transmission of a packet thereto and then the same packet through the switched-ON antenna is re-transmitted. Namely, the switching of a working antenna from one to another may be conducted every packet-transmission.

Referring to a flow chart of FIG. 10, the operation of the above-mentioned system to which the present invention is applied will be described as follows:

This is an embodiment usable for the system of FIGS. 4A, 4B, 6A, 6B, 6C and 8B for the embodiments 1 to 3.

First, the system sets a possible maximum number of multiplexed data (at Step 10-1).

Data is transmitted (Step 10-2) and a ACK or NAK signal is received (Step 10-3) and checked (Step 10-4). With the ACK signal received for acknowledging the correct transmission, a subsequent packet data is detected (Step 10-5) and transmitted if the data exists. The data transmission ends when the last requested data was transmitted (Step 10-6).

In the event if a NAK signal or no response is received or any response signal is incorrectly received (at Step 10-4), it is considered that the data could not correctly be received by the receiving party. In this instance, the same packet is transmitted again. Every time when the such event (failure) occurred, the number "n" of the failures (NAK signal, no response and incorrectly received response) is compared with two different preset values "j" and "k" (Step 10-7, Step 10-8) and re-transmission of the same packet is repeated until the number "n" reaches the preset value k (Step 10-9). When the re-transmission at the time exceeding the preset value k (n>k) resulted in failure, it is considered that propagating conditions is wrong, C/N is wrong or the antenna is unsuitable. At this time, the working antenna is first switched to another (Step 10-10). If further re-transmissions resulted in failure (n>j), the effect of a large delay dispersion must be considered and, at this time, re-transmission is conducted with a packet of data in less multiplexed state (Step 10-11). The information of the multiplexing number in the simplex portion is, of course, corrected.

Thus, the use of the aerial diversity switching method in combination with the method of changing the number of multiplexed data can further improve the throughput of the system.

The transmission rate is decreased with a reduced number of multiplexed data but is not decreased by switching the aerial diversity. Accordingly, it is expected to realize the successful transmission by using the procedure that can provide the effect of the improved aerial diversity first and the effect of the reduced number of multiplexed data, if the problem could not be eliminated by improving the aerial diversity.

It is also possible to reset an n-counter at 1 if the ACK signal is received after having re-transmitted the same packet several times because the current transmission conditions may be considered as still be allowable. This step, however, is not shown in the flow chart of FIG. 9.

The presettable value "k" shall be determined, based on the results of simulations and experiments, to an optimal value at which a maximal throughput of the system may be obtained.

The performance of the system according to the shown embodiment can be further improved by combining with features of any of the other embodiments based on the respective systems of FIGS. 4A, 4B, 6A, 6B, 6C and 8B.

Referring to a flow chart of FIG. 11, the operation of a sixth embodiment of the present invention is as follows:

In the fourth embodiment described before, the number of multiplexed data is first set at the maximal value and it is then reduced as the need be. However, in the case there is a small quantity of transmittable packets, it is preferable to transmit packets first at a maximal transmission rate and then reduce the rate as the need be.

On the other hand, in the case of transmitting a large number of packets, the propagation conditions may get better or worse during transmissions. Accordingly, it is desirable to reduce the transmission rate while the propagating conditions are wrong but to increase the number of multiplexed data when the propagation conditions are improved. This may improve the throughput of the system.

Figure 11:
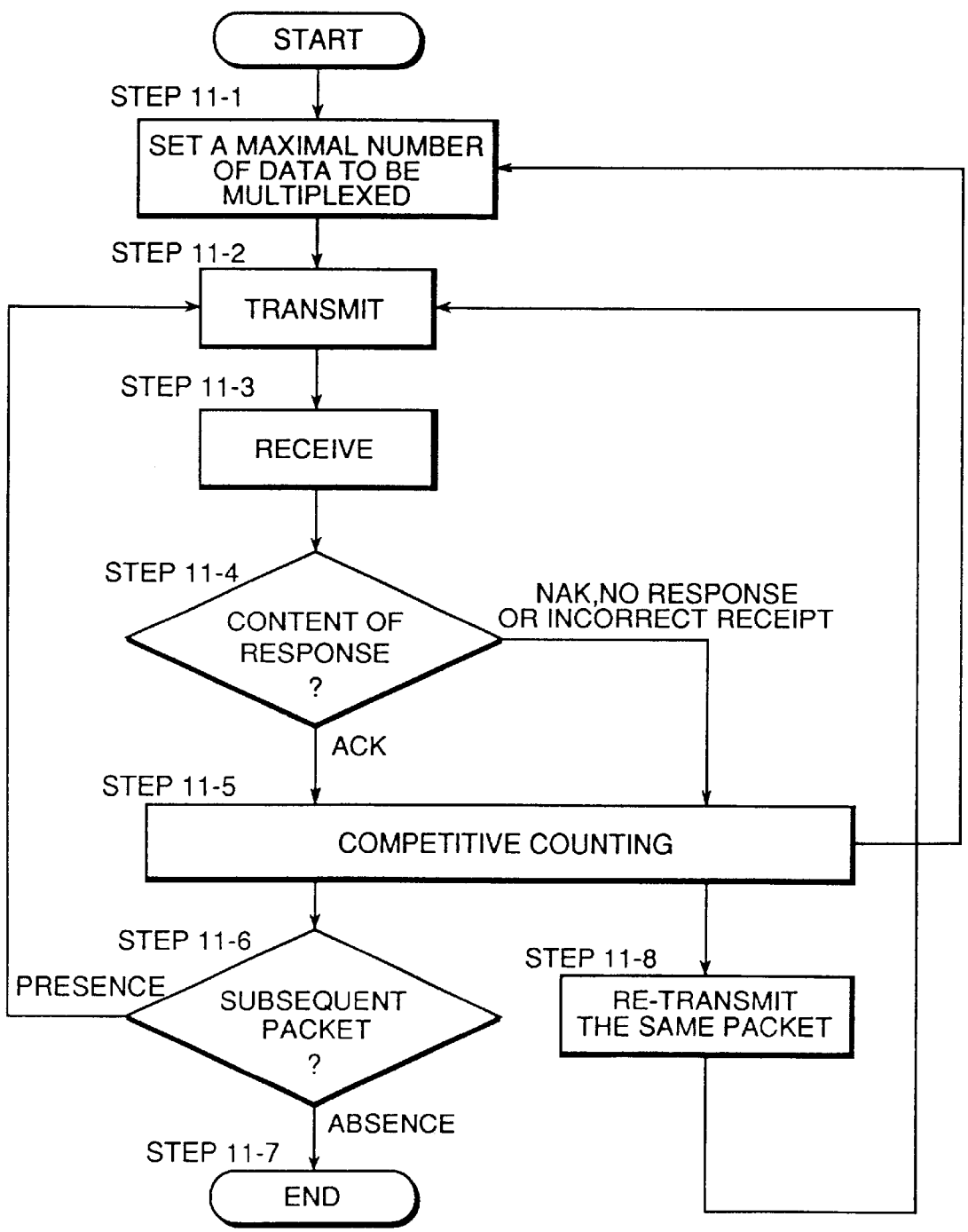
FIG. 11 is a flow chart depicting the operation of a communication system according to another aspect of the present invention.

The present embodiment includes in its system competitive type counters that operate as described in the flow chart of FIG. 11.

This is an embodiment usable for the system of FIGS. 4A, 4B, 6A, 6B, 6C and 8B for the embodiments 1 to 3.

First, the system sets the number of multiplexed data (Step 11-1). In this case, the maximal value, for example, is set.

Data is transmitted (Step 11-2) and a ACK or NAK signal is received (Step 11-3) and checked (Step 11-4). Upon receipt of the ACK signal acknowledging the correct transmission, a subsequent packet data is detected (Step 11-6) and transmitted if data is found. The data transmission ends when the last requested data was transmitted (Step 11-7).

In the event if a NAK signal or no response is received or any response signal is incorrectly received (at Step 11-4), it is considered that the data could not correctly be received by the receiving party. In this instance, the same packet is transmitted again (Step 11-8).

In this system, the competitive counters count the number of received ACK signals and the number of received NAK signals (including no response and incorrectly received signals) respectively (Step 11-5). In this case, the number of multiplexed data is controlled to obtain a constant ACK-to-NAK ratio. This ratio shall be determined to be optimal based on the results of simulations and experiments and the circumstances. In this case, the ACK-to-NAK ratio is set for example at 1:3.

The packets are transmitted first at the maximal number of multiplexed data while the number of ACK signals is predominant. When the number of NAK signals increases and exceeds the preset ratio of 1:3, the number of multiplexed data is reduced to decrease the error rate of transmissions (Step 11-1). When the propagating conditions are improved and the ACK-to-NAK ratio becomes better than the preset value, the number of multiplexed data is controlled by increasing the set value (Step 11-1).

According to this embodiment of the present invention, it is possible to transmit packets at the number of multiplexed data, which is adapted to the propagating conditions.

This enables the system to attain the maximal throughput.

The seventh embodiment of the present invention is described as follows:

In the above-mentioned embodiment using the competitive counters, it is also possible to further improve the performance of the system by using the aerial diversity switching function in combination with the competitive counter function.

This embodiment is featured in that the priority is given to the aerial switching method over the method of decreasing the multiplexing number in case of reducing the multiplexing number whereas the priority is given to the method of increasing the multiplexing number in the case of increasing the number of multiplexed data.

Accordingly, the multiplexing number is first increased when the ratio of ACK signals is increased whilst the current antenna is first changed-over to another when the ratio of NAK signals increased.

Thus, the system can be controlled to transmit packets at a higher transmission rate.

Figure 12:
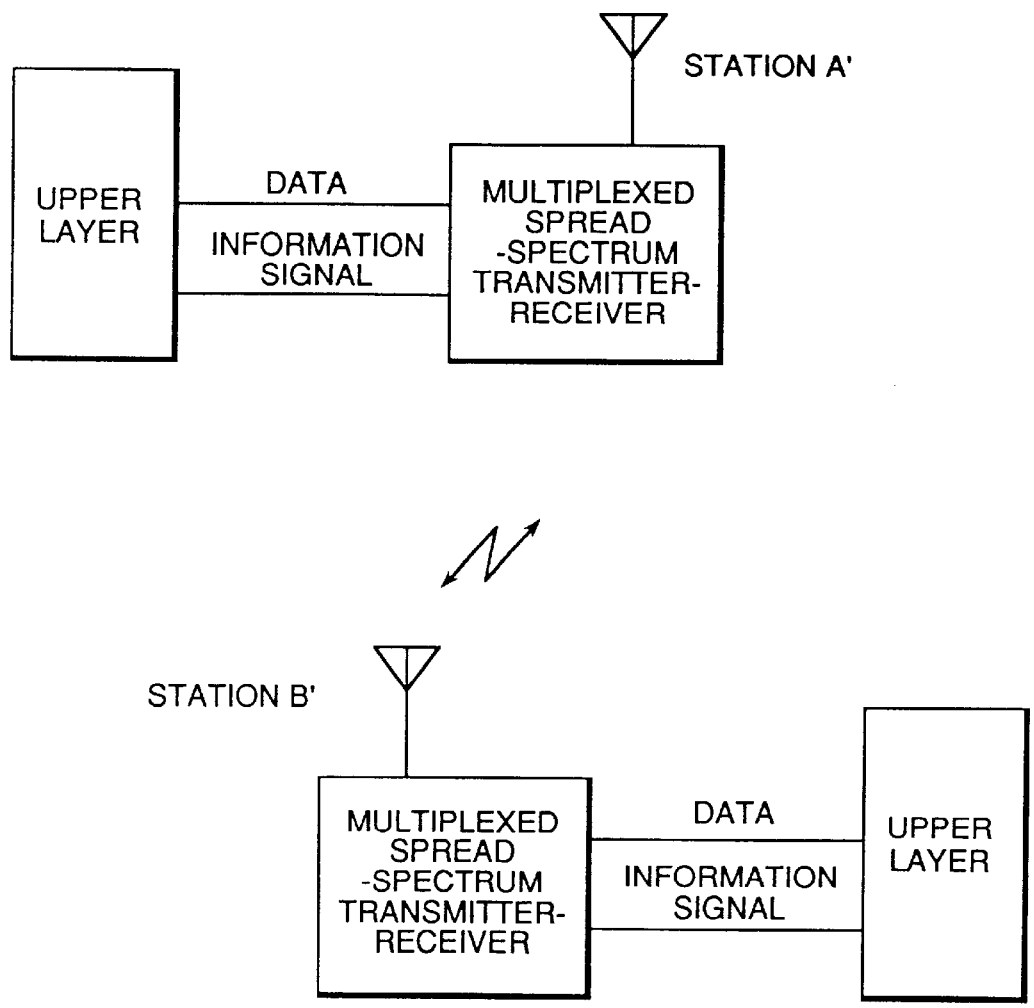
FIG. 12 is a schematic construction view of a multiplex spread-spectrum communication system.
Figure 13:
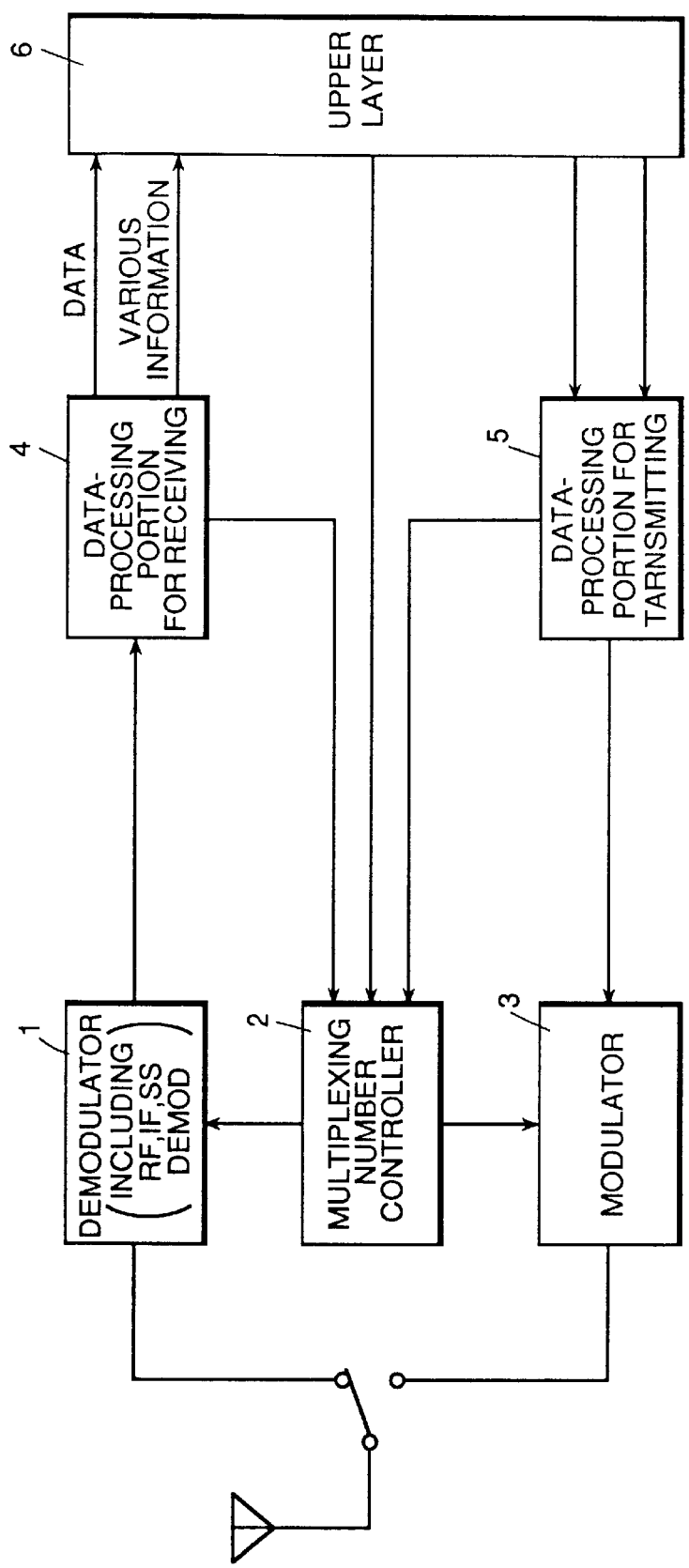
FIG. 13 is a detailed circuit diagram of a transmitting and receiving device in the system of FIG. 12.

Referring to FIGS. 12 and 13, an eighth embodiment of the present invention is described as follows:

Usually, communication devices composing the spread spectrum (SS) multiplex communication system carry out two-way communication under the control of the upper-layer. As shown in FIG. 12, communicating stations A' and B' may alternately transmit and receive data to and from each other under the control of the upper-layer.

Now, it is supposed that the station B' transmits to the station A' same multiplexing number at which the station A' transmitted a last packet to the station B'.

FIG. 13 is a detailed circuit diagram of a communication device of the system, which circuit includes a receiver-side demodulator 1, a receiver-side data-processor 4, a transmitter-side modulator 3, a transmitter-side data-processor 5, an upper-layer 6 and a multiplexing number controller 2.

The communication device provided with the above-mentioned circuit has an integral transmitter-receiver and controlled by the upper-layer 6.

The upper layer 6 controls demodulated and processed resultants in the receiver-side and operates the multiplexing number controller 2 to determine the number of multiplexed data and transmit the data multiplexed at the determined number in the transmitter-side.

Consequently, the stations A' and B' may alternately transmit the optimally multiplexed data respectively, thus improving the throughput of the system.

Figure 14A:
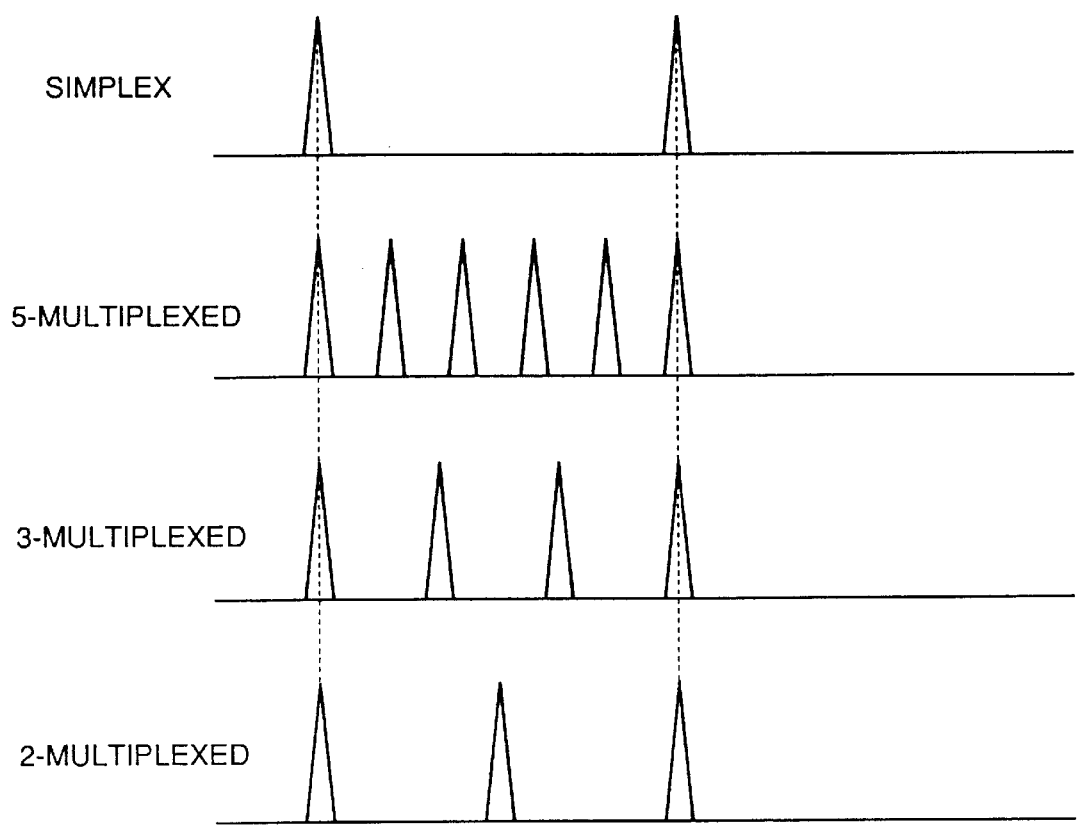
FIGS. 14A and 14B are a waveform diagram of a correlation signal for explaining the operation of a communication system according to the present invention.
Figure 14B:
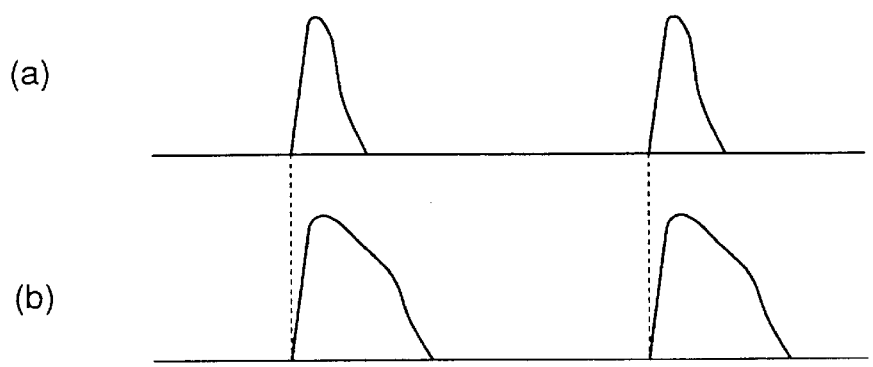

Referring to FIGS. 14A and 14B, a ninth embodiment of the present invention is described as follows:

FIGS. 14A and 14B show correlation waveforms of multiplexed data.

As shown in FIG. 14A and 14B, a distance between correlation spikes is longer for a simplex (not multiplexed) data and becomes shorter as the number of multiplexed data increases. In such circumstances, states of spikes in the presence of a delay dispersion are shown part (a) and part (b) in FIG. 14B.

Part (a) in FIG. 14B relates to the case of a small delay dispersion and Part (b) in FIG. 14B relates to the case of a large delay dispersion. Transmission of largely multiplexed data under the circumstance with a large delay dispersion (part (b)) may cause the correlation spikes to overlap one another, resulting in impairing the data.

Accordingly, to transmit data in the circumstances with a large delay dispersion, it is necessary to previously reduce the number of multiplexed data by using the methods according to the embodiments 4 to 8 described before.

In the embodiments 1 to 3 of the present invention, response signals ASK and NAK are featured by simplex (not multiplexed). Accordingly, the delay dispersion is determined from the state of the response signal and a suitable number of data to be multiplexed is then determined.

The delay dispersion may be of several chips and can not be so large that two subsequent spikes of a not-multiplexed signal may overlap each other. Utilizing this feature of a simplex signal, a delay dispersion of the simplex signal is determined by the correlation waveforms and the suitable number of data to be multiplexed is then determined.

The multiplexing number is thus effectively determined whilst the embodiments 4 to 8 change the multiplexing number only based on the error data with no consideration of a delay dispersion value.

The use of a value determined by this method as a multiplexing number presettable for the sixth embodiment enables the embodiment to work more effectively.

A tenth embodiment of the present invention is as follows:

The ninth embodiment provides the method of effectively transmit data adaptively multiplexed by determining the number of data to be multiplexed on the basis of the delay dispersion value. For this purpose, it is necessary to determine the delay dispersion value. The delay dispersion value can be determined by using hardware means as well as software means. However, this is necessarily associated with the increased circuitry and an increased amount of the working program.

Accordingly, the above-mentioned calculation is conducted only at a base station In a communication system composed of a base station and terminal stations, the base station performs the above-mentioned calculation and other terminal stations determine the multiplexing number from the data determined at the base station. The base station may inform each terminal of the delay dispersion value by inserting it in the data transmitted thereto or each terminal station uses the same number of multiplexed data in a packet lastly received from the base station.

This can effectively prevent the increase of circuitry of each terminal station that utilizes the values determined at the base station.

An eleventh embodiment of the present invention is as follows:

The tenth embodiment provides that the delay dispersion value is determined at the base station. The sixth and seventh embodiments determine the number of data to be multiplexed at each station. However, one-to-multiple or multiple-to-multiple communication may be associated with frequent change of communicating parties.

Since the delay dispersion and the C/N of transmission vary depending to the locations of the receiving parties, it takes much time to determine a delay dispersion value and an adaptive multiplexing number for each new receiving party, resulting in obtaining a decreased throughput of the system.

Accordingly, the present embodiment provides that each station stores the delay dispersion value and the adaptive multiplexing number determined in advance for each party with an ID. This solution enables each station to rapidly select the suitable number of data to be multiplexed and transmitted to any party. The throughput of the system can be thus improved.

(1) An aspect of the present invention offers an advantageous feature that in the data communication with ARQ by using a system for multiplexing a plurality of series of signals spread by using spread-codes and delayed by any desired number of chips of the spread-codes according a format including a not-multiplexed (simplex) portion, response signals ACK and NAK are transmitted and received as simplex (not multiplexed) portion of the format, thus decreasing an error ratio of the response signals and improving the throughput of the system.

(2) An aspect of the present invention offers an advantageous feature, in addition to that mentioned (1) above, that a procedure for recognizing the connection between terminals by a CSMA/CA with RTS/CTS method before transmitting and receiving a data portion of the transmission format provides a packet for recognizing the establishment of the connection being transmittable and receivable in a simplex (not multiplexed) state, thus assuring an improved error rate of this important connection acknowledgment.

(3) An aspect of the present invention offers such an advantageous feature, in addition to that mentioned (1) and (2) above, that a response-data format for ARQ system includes a flag for identifying response signals and response data such as ACK signal arranged in fields where the number of multiplexed data and packet length were previously arranged and omitted, thus shortening a packet length.

(4) An aspect of the present invention offers, in addition to that mentioned (1) to (3) above, an advantageous feature that the number of data to be multiplexed is variable and is decreased by the multiplexing means when a result of counts of NAK signals including no response reaches any preset number and then data less multiplexed is re-transmitted. This enables the system to improve an error rate of transmissions over wrong propagation path.

(5) An aspect of the present invention offers, in addition to that mentioned (1) to (4) above, an advantageous feature that the system is further provided with an aerial diversity switching system by which a current working antenna (aerial diversity) is switched over to another when a result of counts of received NAK signals including no response or incorrectly received response reaches a specified preset value, and the number of data to be multiplexed for transmission is reduced as the need be, thus conducting well conditioned transmissions.

(6) An aspect of the present invention offers an advantageous feature that frequency of ACK (Acknowledge) signals and frequency of NAK (Negative Acknowledge) signals including no response or incorrectly received response are counted respectively and the number of data to be multiplexed is adaptively controlled for each packet according to an ACK to NAK ratio determined from the respective frequency counts.

(7) An aspect of the present invention offers an advantageous feature, in addition to that mentioned (1) to (6) above, that the system operates the aerial diversity switching system to change a working antenna diversity according to a ratio of counts of received ACK signals to counts of received NAK signals including no response or incorrectly received response and the number of data to be multiplexed for transmission is further reduced as the need be, thus conducting well conditioned transmissions.

(8) An aspect of the present invention offers an advantageous feature, in addition to that mentioned (4) to (7) above, that the number of multiplexed data, which has been received, is used as an initial value to be at the multiplexing means when a direction of data communication between stations is reversed, thus enabling the system to use the number of multiplexed data, which can be considered to be a nearly optimal value.

(9) An aspect of the present invention offers an advantageous feature, in addition to that mentioned (1) to (8) above, that a delay dispersion of the ACK or NAK signal transmitted and received in a simplex (not-multiplexed) state is calculated and an optimal value of the number of data to be multiplexed for transmission can be quickly determined according to the calculation result of the delay dispersion.

(10) An aspect of the present invention offers an advantageous feature, in addition to that mentioned (9) above, that in a system composed of a base station and terminal stations, only the base station calculates the delay dispersion of the simplex signal and determines the number of data to be multiplexed for transmission according to the calculation result and the terminal stations use the number of data to be multiplexed, which is determined by the base station, thus enabling the system to increase the circuitry on only the base station.

(11) An aspect of the present invention offers an advantageous feature, in addition to that mentioned (1) to (10) above, that in an one-to-multiple or a multiple-to-multiple communication system, each of stations composing the system can change by the multiplexing means the number of data to be multiplexed for transmission and stores the number of data to be multiplexed for transmission to each station together with an ID, thereby the each station can optimally communicate with any other station even if frequently changing a party to another.

What is claimed is:

1. A direct-spread-spectrum communication system, comprising:

apparatus transmitting and receiving signals spread by using a spread-code and being multiplexed according to a data format including a simplex portion and a multiplexed portion or only a multiplexed portion or only a simplex portion and, including multiplexing means for multiplexing said signals so as to have a delay time of a predetermined number of chips of the spread-code, the spread signals being transmitted and received packetized in data packets and transmitted by an ARQ (Automatic Repeat Request) method, and wherein an ACK (Acknowledge) signal and a NAK (Negative Acknowledge) signal for acknowledging the receipt of correctly or incorrectly transmitted signals are transmitted and received only as simplex spread-spectrum signals; and, wherein the number of multiplexed data in the data packets is controlled and decreased when a result of counts of received NAK signals indicating incorrect receipt of transmissions includes no response or incorrectly received response reaches a specified preset value, or a predetermined ratio of an ACK to NAK signal count exists and wherein the decreased number of data packets is then re-transmitted and received in a simplex state.

2. A direct-spread-spectrum communication system as defined in claim 1, wherein a procedure, for sensing the connection between terminals by a CSMA/CA (Carrier Sense Multiple Access with call Accepted) with RTS/CTS (Request To Send/Clear To Send) method, is executed before transmitting and receiving a data portion according to the data format, by using a data packet transmitted and received as simplex spread-spectrum signals.

3. A direct-spread-spectrum communication system as defined in claim 1, wherein a response data format for the ARQ method includes a flag for identifying response signals and response data such as an ACK signal arranged in fields of the response data format where the number of multiplexed data and a packet length were previously arranged.

4. A direct-spread-spectrum communication system as defined in claim 1, wherein the apparatus additionally includes an aerial diversity system by which a working aerial diversity is changed when a result of counts of received NAK signals indicating incorrect receipt of transmissions including no response or incorrectly received response reaches a specified preset value, and data is then re-transmitted therethrough and received.

5. A direct-spread-spectrum communication system, comprising:

apparatus transmitting and receiving signals spread by using a spread-code and being multiplexed according to a data format including a simplex portion and a multiplexed portion, and including multiplexing means for multiplexing said signals so as to have a delay time of any desired number of chip of the spread-code, the spread signals being transmitted and received packetized and transmitted by an ARQ (Automatic Repeat Requesting) method, wherein the number of data to be multiplexed in the multiplexing means is controlled, and a frequency of ACK (Acknowledge) signals for acknowledging the receipt of correctly transmitted signals and a frequency of NAK (Negative Acknowledge) signals for acknowledging the receipt of incorrectly transmitted signals including no response or incorrectly received response are respectively countable, and the number of data to be multiplexed, transmitted and received is controlled according to a ACK to NAK count ratio determined from the respective count values.

6. A direct-spread-spectrum communication system as defined in claim 5, wherein the apparatus further includes an aerial diversity system controlled by said count ratio.

7. A direct-spread-spectrum communication system as defined in claim 1, wherein the number of received multiplexed data is used as an initial value for the multiplexing means when a direction of data communication between stations is reversed.

8. A direct spread-spectrum communication system as defined in claim 7, wherein the number of data multiplexed in the multiplexing means is controlled, and a delay dispersion of the ACK or NAK signals transmitted and received in a simplex state is calculated and an optimal value of the number of data multiplexed for transmission is determined according to the calculation result of the delay dispersion and used to control the multiplexing means.

9. A direct-spread-spectrum communication system as defined in claim 8, wherein the apparatus includes a base station and a terminal station, wherein only the base station calculates the delay dispersion of the simplex signal and determines the number of data multiplexed for transmission according to the delay dispersion calculated and, wherein the terminal station uses the number of multiplexed data determined by the base station.

10. A direct-spread-spectrum communication system as defined in claim 1, wherein the system comprises a one-to-multiple or multiple-to multiple communication system in which each connectable station of the system controls the number of data multiplexed for transmission by respective multiplexing means, stores previously determined numbers of multiplexed data for transmission for the other connectable stations of said system together with respective identifications thereof, and then controls the number of data to be multiplexed for transmission.

11. A direct sequence spread spectrum communication system, comprising:

at least one station for transmitting and at least one station for receiving data in signals spread by using a spread-code and multiplexed according to a data format having a simplex portion and a multiplexed portion or only a multiplexed portion or only a simplex portion, and including multiplexing means for multiplexing the data so as to have a delay time of a predetermined number of chips of the spread-code, the spread signals transmitted and received being packetized in data packets and transmitted by an ARQ (Automatic Repeat Request) method, wherein an ACK (Acknowledge) signal and a NAK (Negative Acknowledge) signal for acknowledging the receipt of correctly or incorrectly transmitted signals are transmitted and received as simplex spread-spectrum signals and wherein the number of multiplexed data in the data packets or the aerial diversity is controlled based on the results of a number of counts of received NAK signals or the calculation of an ACK to NAK signal count ratio.

12. A direct-spread-spectrum communication system, comprising:

apparatus for transmitting and receiving signals spread by using a spread-code and multiplexing according to a data format including a simplex portion and a multiplexed portion or only a multiplexed portion or only a simplex portion and, including multiplexing means for multiplexing said signals at a delay time of a predetermined number of chips of the spread-code, the spread signals transmitted and received being packetized in data packets and transmitted by an ARQ (Automatic Repeat Request) method, wherein an ACK (Acknowledge signal and a NAK (Negative Acknowledge) signal for acknowledging the receipt of correctly or incorrectly transmitted signals are transmitted and received only as simplex spread-spectrum signals; and, wherein the number of multiplexed data in the data packets is controlled and decreased when the result of counts of received NAK signals, indicating incorrect receipt of transmissions includes no response or incorrectly received responses reaches a specified preset value relative to the counts of received ACK signals and, wherein data in a simplex state is then re-transmitted and received.

13. A direct-spread-spectrum communication system, comprising:

apparatus for transmitting and receiving signals spread by using a spread-code and multiplexing according to a data format including a simplex portion and a multiplexed portion or only a multiplexed portion or only a simplex portion and, including multiplexing means for multiplexing said signals at a delay time of a predetermined number of chips of the spread-code, the spread signals transmitted and received being packetized in data packets and transmitted by an ARQ (Automatic Repeat Request) method, wherein an ACK (Acknowledge) signal and a NAK (Negative Acknowledge) signal for acknowledging the receipt of correctly or incorrectly transmitted signals are transmitted and received only as simplex spread-spectrum signals; and apparatus by which a working aerial diversity is changed when a result of counts of received NAK signals indicating incorrect receipt of transmissions including no response or incorrectly received response reaches a specified preset value relative to the counts of received ACK signals, and data is then re-transmitted therethrough and received.

14. A direct-spread-spectrum communication system, comprising:

apparatus transmitting and receiving signals spread by using a spread-code and being multiplexed according to a data format including a simplex portion and a multiplexed portion or only a multiplexed portion or only a simplex portion and, including multiplexing means for multiplexing said signals so as to have a delay time of a predetermined number of chips of the spread-code, the spread signals being transmitted and received packetized in data packets and transmitted by an ARQ (Automatic Repeat Request) method, and wherein an ACK (Acknowledge) signal and a NAK (Negative Acknowledge) signal for acknowledging the receipt of correctly or incorrectly transmitted signals are transmitted and received only as simplex spread-spectrum signals; and, wherein the number of data multiplexed in the multiplexing means is controlled, and a delay dispersion of the ACK or NAK signals transmitted and received in a simplex state is calculated and an optimal value of the number of data multiplexed for transmission is determined according to the calculation result of the delay dispersion and is used to control the multiplexing means.

* * * * *